United States Patent
Ammicht et al.

[11] Patent Number: 5,598,468
[45] Date of Patent: Jan. 28, 1997

[54] METHOD AND APPARATUS FOR ECHO REMOVAL IN A COMMUNICATION SYSTEM

[75] Inventors: Egbert Ammicht, Budd Lake, N.J.; James C. H. Thi, Gaithersburg, Md.

[73] Assignee: Lucent Technologies Inc., Murray Hill, N.J.

[21] Appl. No.: 386,174

[22] Filed: Feb. 9, 1995

Related U.S. Application Data

[63] Continuation of Ser. No. 69,960, May 28, 1993, abandoned.

[51] Int. Cl.$^6$ .................... H04M 9/08
[52] U.S. Cl. ............ 379/410; 379/406; 379/390; 370/290
[58] Field of Search ............... 379/388, 390, 379/389, 395, 406, 407, 410, 411; 370/32.1

[56] References Cited

U.S. PATENT DOCUMENTS

| | | | |
|---|---|---|---|
| 4,029,912 | 6/1977 | Geigel et al. | 379/406 |
| 4,782,525 | 11/1988 | Sylvain et al. | 379/410 |
| 4,845,746 | 7/1989 | Li | 379/410 X |
| 4,864,608 | 9/1989 | Miyamoto et al. | 379/409 |
| 4,894,820 | 1/1990 | Miyamoto et al. | 370/32.1 |
| 4,897,832 | 1/1990 | Suzuki et al. | 374/410 X |
| 4,918,727 | 4/1990 | Rohrs et al. | 379/410 |
| 4,951,269 | 8/1990 | Amano et al. | 367/135 |
| 4,979,163 | 12/1990 | Erving et al. | 370/32.1 |
| 4,984,265 | 1/1991 | Connan et al. | 379/390 |
| 5,007,046 | 4/1991 | Erving et al. | 370/32.1 |
| 5,016,271 | 5/1991 | Ford | 379/410 |
| 5,099,472 | 3/1992 | Townsend et al. | 370/32.1 |
| 5,136,577 | 8/1992 | Amano et al. | 370/32.1 |
| 5,193,112 | 3/1993 | Sano | 379/410 |
| 5,272,695 | 12/1993 | Makino et al. | 370/32.1 |
| 5,305,307 | 4/1994 | Chu | 370/32.1 |
| 5,307,405 | 4/1994 | Sih | 379/410 |
| 5,343,521 | 8/1994 | Jullien et al. | 379/410 |
| 5,353,348 | 10/1994 | Sendyk et al. | 379/410 |
| 5,390,250 | 2/1995 | Janse et al. | 379/410 |
| 5,418,848 | 5/1995 | Armbrüster | 379/406 |

*Primary Examiner*—Ahmad F. Matar
*Assistant Examiner*—T. Devendra Kumar
*Attorney, Agent, or Firm*—Martin I. Finston

[57] ABSTRACT

A signal processor for, e.g., a telephonic communication system interconnecting a near location and at least one far location includes an echo canceller for suppressing the re-transmission of received signals. The operation of the echo canceller is controlled according to whether the near location is transmitting or receiving, and whether the far location is transmitting or receiving. The signal processor includes means for detecting doubletalk, and for controlling the echo canceller in response to the detection of doubletalk, such that doubletalk is permitted. In one method of operation, a delay is applied to the inputs to the echo canceller from the near and far ends, such that each of these signals is used for determining the operating state of the echo canceller before being used to operate an adaptive filter of the echo canceller. In another method of operation, doubletalk detection is carried out, in part, by evaluating the performance of an auxiliary adaptive filter. In another method of operation, the doubletalk detection is carried out, in part, by evaluating a pair of statistics that respectively indicate whether the near-end input to the echo canceller contains more energy than an expected echo generated from the far-end input, and whether an echo is being effectively removed. According to such method, a doubletalk state is declared only is these statistics satisfy predetermined conditions.

24 Claims, 7 Drawing Sheets

1

METHOD AND APPARATUS FOR ECHO REMOVAL IN A COMMUNICATION SYSTEM

This application is a continuation of application Ser. No. 08/069960, filed on May 28, 1993, now abandoned.

FIELD OF THE INVENTION

This invention relates to communication systems that connect two or more separate locations, each equipped with a speakerphone or the like. More specifically, the invention relates to echo-cancellation methods for inhibiting the retransmission of audible signals from a receiving location to the transmitting location.

ART BACKGROUND

FIG. 1 is a simplified schematic diagram of a two-way communication system connecting a near conference room 1 and a far conference room 2. (The terms "near" and "far" are adopted for convenience only. Moreover, for the sake of brevity, most of the explicit discussion that follows is limited to signal processing activities that take place at the near conference room and apparatus associated therewith. It will be understood that wholly analogous activities will generally also take place at the far conference room and associated apparatus.) Each conference room is equipped with, e.g., a speakerphone arrangement having a microphone 30.1, 30.2 and a loudspeaker 40.1, 40.2. Each conference room also has a signal processor 50.1, 50.2 that performs analog-to-digital and digital-to-analog conversions, and provides an electronic interface between the local speakerphone and the telephone lines or other transmission medium external thereto.

It has long been recognized that speech originating in, e.g., room 2 and broadcast into room 1 from loudspeaker 40.1 can be recycled through microphone 30.1 and rebroadcast into room 2. The recycled speech will be heard in room 2 after a time delay corresponding to a round trip through the signal processors and transmission media. The result will often be perceived as an annoying echo. Moreover, if the recycled speech experiences a total gain over the round trip that exceeds unity, an annoying feedback oscillation, referred to as "singing," may also be produced. In fact, recognition of these problems antedates the widespread use of speakerphones. Similar problems have long been known to occur when imperfect impedance matches between ordinary handset telephones and two-way telephone lines produce annoying circuit echoes.

Turning again to FIG. 1, the respective acoustic signals input to microphones 30.1 and 30.2 may be denoted $N_1(t)$ and $N_2(t)$. The corresponding acoustic signals broadcast, respectively, by loudspeakers 40.2 and 40.1 may be denoted $F_2(t)$ and $F_1(t)$. Thus, the near-in speech $N_2$ originating at room 2 is broadcast as the far-in speech $F_1$ at room 1. An echo of this far-in speech may be injected into microphone 30.1, together with near-in speech $N_1$ originating in room 1. This echo is modified by the acoustic characteristics of room 1, represented by the impulse-response function $H_1$. Thus, the total acoustic signal injected into microphone 30.1 may be represented as $N_1 + F_1 * H_1$, where the symbol "*" represents mathematical convolution.

Practitioners of the telephonic arts have employed several techniques for reducing the amplitude of the acoustic signal, corresponding to $F_1 * H_1$, that is rebroadcast from loudspeaker 40.2. In the technique knowns as "echo suppression," the gain in line 60.1, which transmits from room 1 to room 2, is reduced when far-in speech is detected in room 1, and increased when near-in speech is detected. Although useful, echo suppression is not entirely satisfactory in some respects. For example, the transition between low gain and high gain, triggered by the onset of the near-in speech, is not instantaneous. As a result, a small but noticeable initial fragment of the near-in speech is often cut off.

A second technique, referred to as "echo cancellation," is conveniently described with reference to FIG. 2. According to that technique, an artificially modified signal, intended to approximate $F_1 * H_1$, is subtracted at summing element 70 from the signal transmitted in line 60.1 from microphone 30.1. The modified signal is created by directing a replica of $F_2$ from line 60.2 through filter 80. Filter 80 is designed to have an impulse response that approximates $H_1$. As a result, the echo component of the output of microphone 30.1 is at least partially canceled from the signal that remains in that portion of line 60.1 lying beyond the summing element.

The impulse response $H_1$ of the conference room can be influenced by many factors, including the arrangement of people and furniture in the conference room, the relative positioning of microphones and loudspeakers, and the volume setting in the speakerphone unit. As a consequence, it is generally advisable for filter 80 to include a capability for varying the parameters that define the filter impulse response. As shown symbolically in FIG. 2, adaptive filters have in fact been made, in which parameter control 90 varies the filter parameters to minimize an appropriate measure, in response to a feedback signal tapped into feedback line 100. This process is referred to as "adaptation" of the filter. (Although represented in the figure as an analog function, it should be noted that adaptation is often performed digitally.)

Echo cancellers, especially those including adaptive filters, have been at least partially successful in removing echo from telephone networks. However, in at least some cases, failure to precisely define the intervals of near-in speech has caused the filter parameters to diverge, consequently degrading the performance of the echo canceller. That is, filter adaptation is preferably carried out only during those intervals when far-in speech is present but near-in speech is absent, since in that case the optimum parameter setting is unambiguously defined as the setting that brings the feedback signal to zero. However, at least some of the echo cancellers of the prior art permit a portion of the adaptation process to take place during near-in speech. This provides false feedback information, which may cause the filter parameters to diverge.

Thus, the effectiveness of both echo suppressors and echo cancellers has suffered from a failure to precisely define speech intervals, such as intervals of pure near-in speech and intervals of pure far-in speech.

SUMMARY OF THE INVENTION

The invention involves a network for telephonic communication between a first location and at least one additional location, to be referred to as the second location. Installed at each location is at least one microphone or other input transducer and at least one loudspeaker or other output transducer. (In the following discussion, it will be assumed, for convenience, that the input and output transducers are, respectively, microphones and loudspeakers.) The microphone and loudspeaker at each of the first and second locations are electronically coupled to a respective first or second signal processing system. The first and second signal processing systems are electronically coupled to each other by a transmission medium.

At least the first system includes a control. The control receives digitized electrical signals from the first microphone and the second microphone. In response to the present operating state and the first and second microphonic signals, the control selects one of a plurality of operating states of the system.

When selecting an operating state, the control performs mathematical transformations of the first and second microphonic signals, resulting in the evaluation of at least two time-varying statistics. These statistics indicate whether near-in speech is present, and whether far-in speech is present, and also discriminate between poor adaptation of the filter impulse response, and the presence of doubletalk. This represents an advance over related systems of the prior art, which generally base the state selection on only one such statistic and, at least in some cases, do not have a state that corresponds specifically to the double-talk condition. We have found that the use of two or more statistics gives more reliable, and more accurate, indications of the input conditions.

A further advantage of the inventive echo canceller is that it places minimal constraints on those factors that influence the impulse response of the local environment, such as bodily movements and relative displacements of the microphone and loudspeaker.

By way of example, an illustrative system, to be described in detail below, has four operating states denoted "transmit" (TX), "receive" (RX), "double-talk" (DT), and IDLE. When pure near-in speech is indicated, the control selects the TX state. When pure far-in speech is indicated, the RX state is selected. When both near-in and far-in speech are indicated, the DT state is selected. When neither near-in nor far-in speech is indicated, the IDLE state is selected.

Returning to the general discussion, the first system further includes an echo canceller for processing the first microphonic signal before it is transmitted to the second location. This processing includes generating a subtractive echo signal and combining the subtractive signal with the first microphonic signal such that the resultant signal transmitted to the second location is at least partially free of echo. The echo canceller includes an adaptive filter. The adaptive filter is activated by the control only during one or more selected states, fewer than all possible states of the system. (By way of example, the adaptive filter of the illustrative system mentioned above is activated only during the RX state.)

As noted, the control evaluates at least two statistics that characterize the first and second microphonic signals. One statistic, denoted E, is a measure of the effectiveness of the echo canceller. E is obtained by using the adaptive filter, and is related to the average acoustic input to the first microphone, divided by the average of the first microphonic signal after echo cancellation. In some cases, E may relate to a particular sub-band, and in other cases, E may relate to the full signal bandwidth.

The second statistic, denoted G, is an indicator of excess energy in the path from the loudspeaker to the microphone at a given location. This provides a test for the simultaneous presence of near and far speech at that location, and thus serves to discriminate between: a) poor filter adaptation while in the RX state, and b) the presence of doubletalk.

In some embodiments, the first system further includes an element for producing a delay in the input signals. Because of this delay, the control receives these signals before the echo canceller receives them. Consequently, and in distinction to systems of the prior art, the state of the system is adjusted in response to the input signals, and the active or inactive status of the adaptive filter is determined accordingly, before these signals are received by the echo canceller. This delay allows for a more accurate determination of the onset of a state transition.

DETAILED DESCRIPTION OF A PREFERRED EMBODIMENT

Figure 1:
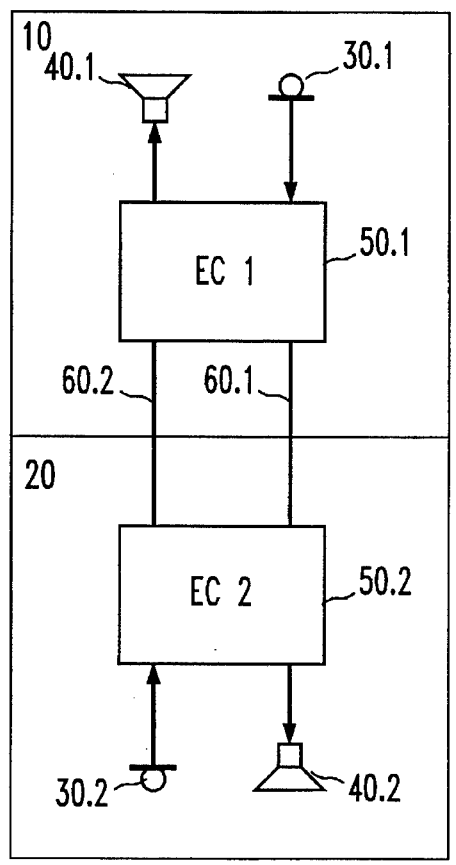
FIG. 1 is a simplified, schematic diagram of a two-way communication system of the prior art.
Figure 2:
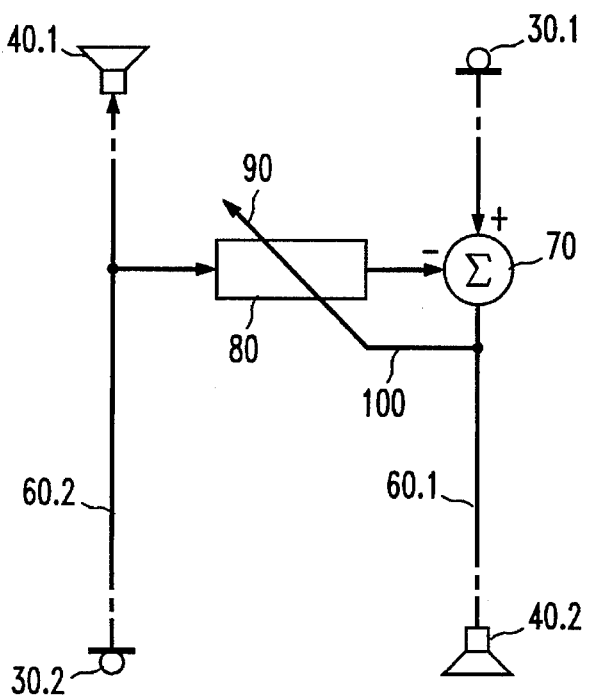
FIG. 2 is a simplified, schematic diagram of an echo canceller of the prior art.
Figure 3:
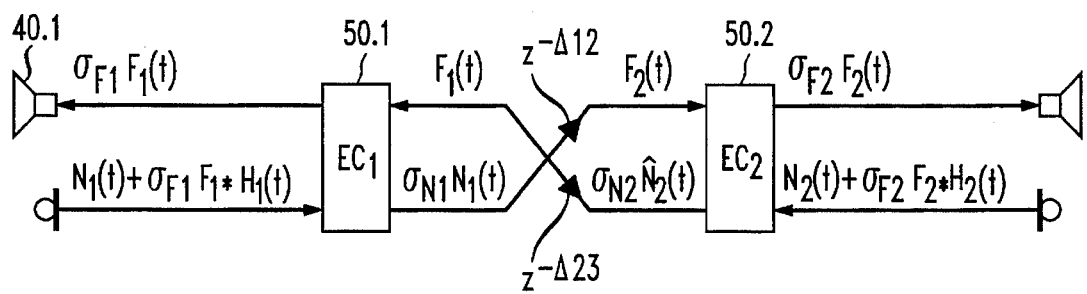
FIG. 3 is a simplified, schematic diagram of an illustrative communication network according to the invention, in one embodiment.

A two-way communication network is schematically depicted in FIG. 3. As indicated in the FIG., each signal traveling from one location to the other experiences, in transit, at least one delay $\Delta_{ij}$, where (i,j) equals (1,2) for signals traveling from the near to the far location, and (2,1) for signals traveling in the other direction. Signal processor 50.1 modifies the far input $F_1(t)$ to loudspeaker 40.1 according to a loss factor $\sigma_{F1}$. As discussed below, control 260 may vary this loss factor according to the state of the signal processor. The near-side input $S_N$ to processor 50.1 is equal to $N_1(t)+\sigma_{F1}F_1*H_1(t)$, as discussed above. The corresponding output of processor 50.1 is denoted $\sigma_{N1}\hat{N}_1(t)$. The coefficient $\sigma_{N1}$ is a further loss factor contributed by processor 50.1. As discussed below, control 260 may vary this loss factor according to the state of the signal processor.

The signal $\hat{N}_1(t)$ is the approximation of the near-in speech $N_1(t)$ created by subtracting an artificially created approximation to the echo signal from the digitized output of microphone 30.1. When this processed signal is input to signal processor 50.2 at the opposite end of the network, it is designated $F_2(t)$. $F_2(t)$ incorporates a time delay $\Delta_{12}$.

Analogous operations are performed at the far location by processor 50.2. Thus, at the ith location (i=1,2; j=1,2; i≠j), the far end input $F_i$ is related to the corresponding far end output $\hat{N}_j$ by $$F_i(t) = \sigma_{Nj}\hat{N}_j(t-\Delta_{ji}). \quad (1)$$

Figure 4:
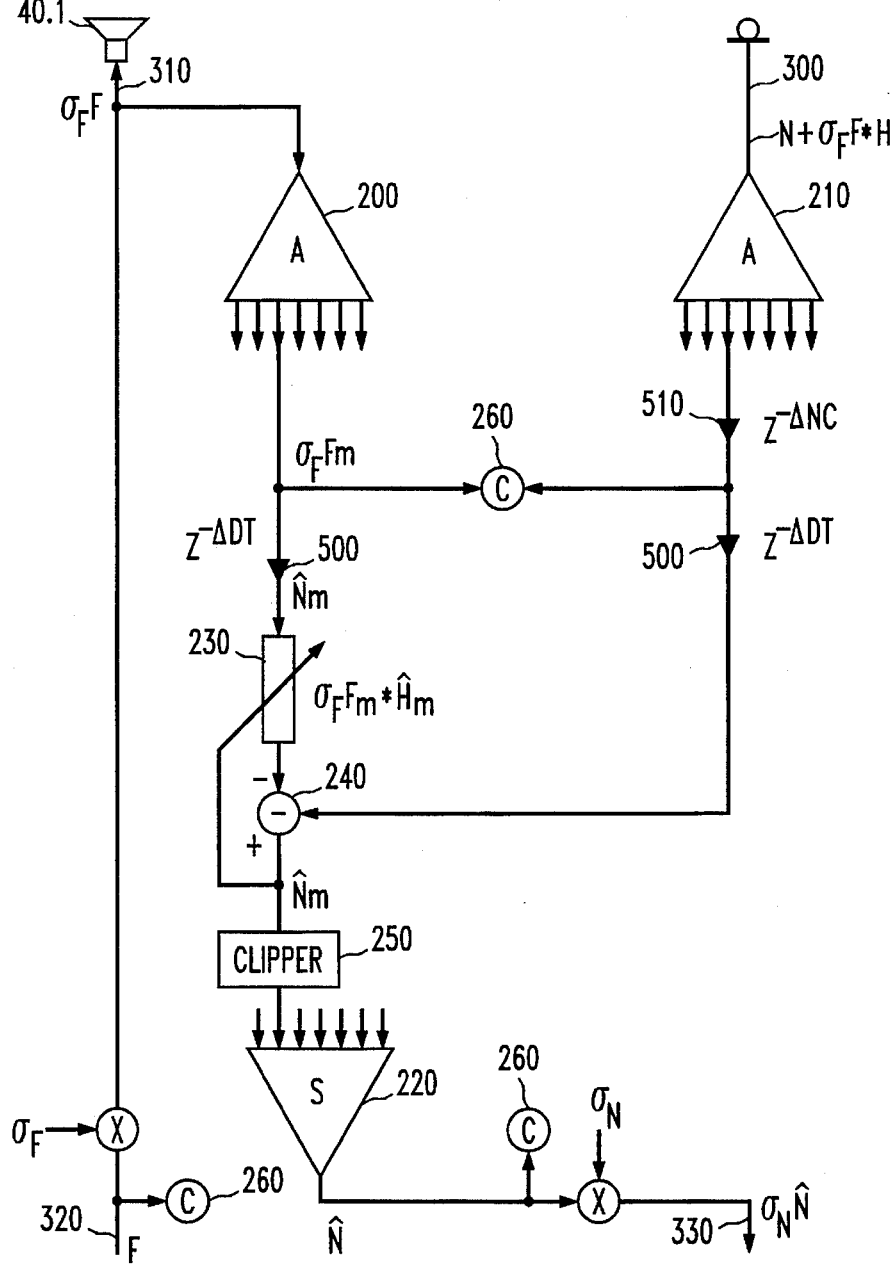
FIG. 4 is a partial, schematic block diagram of a signal processor according to the invention, in one embodiment.

FIG. 4 is a partial, schematic block diagram of a signal processor such as processor 50.1. At sub-band analyzer 200, the far speech signal is filtered by an analysis sub-bank containing M sub-bands, and processed by a decimator having decimation factor N. Thus, the mth sub-band will carry a signal $\sigma_F F_m$, =1, ..., M. (The subscripts i and j have been dropped for convenience.) A bandwidth equal to the sampling frequency is spanned by these M sub-bands. For typical telephonic applications, M will generally lie in the range 32–256. This number will be determined, in any given application, by the signal bandwidth, the desired signal quality, the filter-bank delay, and the processing load that can be tolerated.

A second analyzer and decimator combination 210 is used to divide the near speech signal into the same sub-bands. After sub-band adaptive filter 230 removes the echo components from these sub-band signals, they are recombined at sub-band synthesizer 220 to create the echo-cancelled signal $\hat{N}(t)$.

The use of a digital filter bank, such as a DFT polyphase filter bank, to decompose a signal into sub-bands is well-known in the art.

Within the mth sub-band (m=1, ..., M), an adaptive filter 230 and summing element 240 perform echo cancellation essentially as described above. The sub-band far input $\sigma_F F_m$ is convolved with a model sub-band impulse response function $\hat{H}_m$, represented as weight vector $h_m$. Each element of this vector corresponds to a particular time delay in the echo signal. (These elements are sometimes referred to as "taps.")

The sub-band adaptive filter implements a least mean square (lms) algorithm, or, alternatively, a recursive lms algorithm, according to well-known methods. In, e.g., the lms algorithm, the difference $\hat{N}_m$ generated at summing element 240 is taken as an error signal. The weight vector $h_m$ is updated during each computational cycle such as to drive this error signal to zero during those periods when control 260 has determined that there is no near speech $S_N(t)$, but there is far speech. The increment by which each element of $h_m$ is changed is proportional to the error signal and to a step size denoted μ. In preferred embodiments, this increment is also normalized by the current power of the signal $\sigma_F F_m$. Such a normalized increment is represented by $$h_{n+1} = h_n + \frac{2\mu \sigma_m F_m^*}{\sigma_m^2 F_m F_m^*} \hat{N}_m, \quad (2)$$

where $h_n$, and $h_{n+1}$ represent a given element of a given weight vector $h_m$ at times n and n+1, respectively.

In current embodiments, the step size 2μ assumes one of two possible values: either 0, or a predetermined value lying between 0.3 and 0.75, inclusively. However, optional additional values are readily included, such that the step size is relatively small when the filter is well adapted and relatively large when it is poorly adapted.

In preferred embodiments, the step size is set to zero (i.e., adaptation is disabled) when, inter alia, the signal $\sigma_F F_m$ has a very small amplitude.

Also in preferred embodiments, the number of taps varies according to the sub-band. That is, higher frequencies tend to decay more rapidly than lower frequencies. Thus, the number of taps is tapered, such that more taps are used for the lower frequency than for the higher frequency sub-bands.

As shown in FIG. 4, each output $\hat{N}_m$ from a respective adaptive filter is modified by a center clipper 250 before the respective filter outputs are recombined in synthesizer 220. A center clipper discriminates against signals lying below a predetermined amplitude threshold. In that way, it is useful for removing relatively weak, residual echoes from the filter output. Because center clipping can distort speech, clipper 250 is preferably activated only when control 260 determines that there is far speech but no near speech (i.e., when the system is in the RX state). (In at least some cases, it may also be advantageous to perform center clipping during doubletalk.) Because center clipping may cause speech to sound distorted, preferred embodiments include an additive source of noise (not shown), situated, e.g., at the far output of the echo canceller, that is used to mask such clipping distortion.

The output $\hat{N}_{oc}$ from an illustrative center clipper is described in terms of a predetermined (and possibly sub-band-dependent) threshold γ by the expression $$\hat{N}_{oc} = 0 \text{ if } \frac{L_\alpha(\sigma_F F_c^2)}{L_\alpha(\hat{N}_c^2)} > \gamma, \quad (3)$$

$$\hat{N}_{oc} = \hat{N}_c \text{ otherwise.}$$

In this expression, $L_\alpha$ denotes low-pass filtering using a single-pole filter with parameter α.

As shown in FIG. 4, the signal processor has a near input 300, a near output 310, a far input 320, and a far output 330. The near input (i.e., from the near-end microphone) is the signal N+$\sigma_F$F * H. The far input is the signal F received from the far location. The near output (i.e., to the near-end loudspeaker) is $\sigma_F$F. The far output (i.e., to the far location) is the signal $\sigma_N \hat{N}$.

The purpose of control 260 is: to analyze certain statistics that describe the operation of the communication network; on the basis of these statistics, to assign one of the states RX, TX, DT, or IDLE to the signal processor; and according to the state, to assign values to operating parameters that include μ, $\sigma_F$, $\sigma_N$, and to determine whether to enable center clipping.

Figure 5:
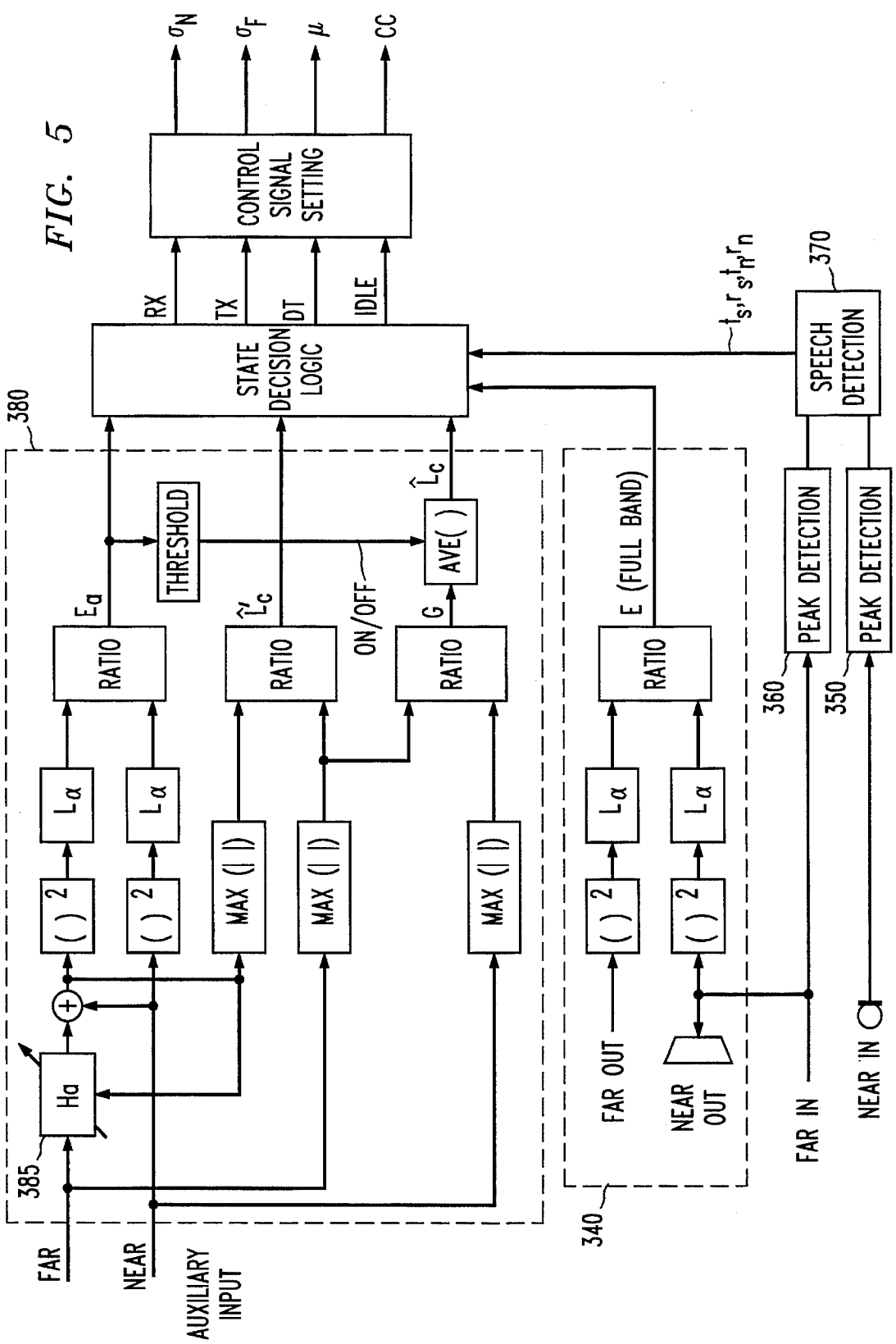
FIG. 5 is an expanded, block diagram of the control component of the signal processor of FIG. 4.

FIG. 5 is an expanded block diagram of control 260. As shown in FIG. 5, full-band performance detector 340, near-in peak detector 350 and far-in peak detector 360 are included within control 260. Detector 350 computes an estimated signal level $t_s$ and an estimated noise level $t_n$ for the signal to be transmitted to the far end of the network. Similarly, detector 360 computes an estimated signal level $r_s$ and an estimated noise level $r_n$ for the signal received from the far end of the network.

Figure 6:
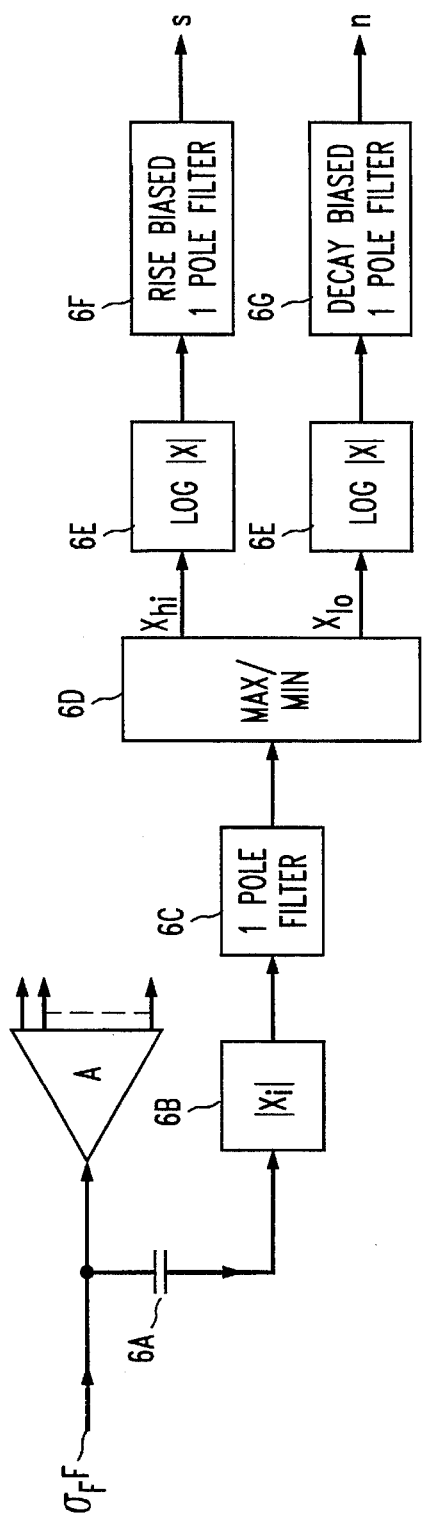
FIG. 6 is a schematic, block diagram of a procedure for computing signal and noise levels in the signal processor of FIG. 4.

A currently preferred method for computing these signal and noise levels is depicted schematically in FIG. 6. As shown there, the full-band data stream $\sigma_F$F is subjected to a high-pass filter to remove dc bias (6A), and then the discrete signal values $x_i$ are converted to absolute values (6B), low-pass filtered (6C) to remove high-frequency noise, and processed (6D) to select the maximum value $x_{hi}$ and minimum value $x_{lo}$ to over an appropriate time window. A typical filter 6C is a numerical, single-pole, low-pass filter. A typical time window is about 16 samples for a 16 kHz sampling rate. (This is equivalent to a 1 kHz decimated sampling rate.) This time window is preferably made adjustable, and is set to a value shorter than the frequency bandwidth of a typical human speech envelope.

The logarithms of the maximum and minimum values are computed (6E). The signal estimate (i.e., $t_s$ or $r_s$) is then obtained by passing the logarithmic maximum values through a rise-biased single-pole filter (6F), and the noise estimate (i.e., $t_n$ or $r_n$) is then obtained by passing the logarithmic minimum values through a decay-biased single-pole filter (6G). A rise-biased filter computes an exponential average that preferentially weights rising values, and a decay-biased filter computes an exponential average that preferentially weights falling values. Filters of this type are described, for example, in U.S. Pat. No. 5,007,046, issued to R. H. Erring et al. on Apr. 9, 1991, at columns 6–7.

Turning back to FIG. 5, control 260 further includes speech detector 370. As described in detail below, this speech detector sets the values of $\sigma_F$ and $\sigma_N$ in response to the signal and noise levels $r_s$, $r_n$, $t_s$, and $t_n$.

Control 260 further includes double-talk detector 380. The purpose of the double-talk detector is to decide between the RX and DT states. This decision is made, in part, according to the value of a statistic denoted $E_a$, defined by $$E_a = \log \frac{L_a(N_a + \sigma_F(F_a * H_a)^2)}{L_a(\hat{N_a}^2)}, \quad (4)$$

where the numerator relates to the near input in sub-band a, and the denominator relates to the output of adaptive filter 385 in sub-band a. Adaptive filter 385 is an auxiliary adaptive filter that operates in a single sub-band, namely, sub-band a. This sub-band is identical to one of the M sub-bands of filters 230, corresponding to a spectral region, such as that around 750 Hz, that (for speech-related applications) is heavily represented in human speech. Unlike the main adaptive filter bank, auxiliary filter 385, according to a currently preferred embodiment, adapts continually in all states of the signal processor.

In effect, $E_a$ measures the effectiveness of the adaptive filter for echo removal. In this sense, $E_a$ is related to a statistic known to practitioners in the art as the Echo Return-Loss Enhancement (ERLE). The ERLE is the logarithm of the ratio of the energy in the echo to the energy in the residual signal output by the adaptive filter in the absence of near speech. This number tends to be large when echo is removed efficiently, and tends toward zero (and even may assume negative values) when echo removal is inefficient (and the echo and residual signal are therefore of comparable magnitude). However, unlike the ERLE, the statistic $E_a$ can be computed from physical quantities that are directly measurable.

Figure 7:
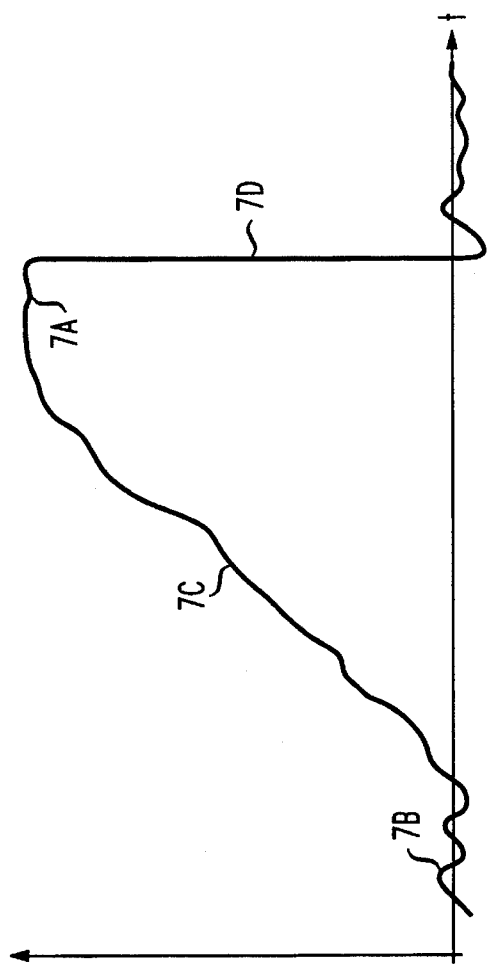
FIG. 7 is an illustrative graph of the typical behavior of a statistic, herein denoted $E_a$, that is evaluated by the inventive signal processor.

The behavior of $E_a$ during operation of the signal processor is conveniently discussed with reference to FIG. 7. In the absence of near speech, $E_a$ will have approximately the same behavior as the ERLE. Thus, the value will be relatively high during periods of good adaptation, as indicated in the portion of the figure labeled 7A. By contrast, the value will be relatively low during periods of low adaptation, such as the portion labeled 7B. The portion labeled 7C represents a transition period during which adaptation is taking place; i.e., the adaptive filter is learning the acoustic characteristics of the room.

By contrast, the onset of near speech will cause $E_a$ to drop abruptly toward zero, since in this case the numerator and denominator of the above expression will be comparable, even for a well-adapted filter. The resulting cliff in the $E_a$ curve is labeled 7D in the Figure.

Thus, a relatively high value of $E_a$ indicates that the system is well adapted, receiving, and not transmitting. By contrast, a relatively low value indicates that either: a) the system is poorly adapted; or b) there is no far input; or c) there is near speech. Because adaptation is desirable in condition a, but not in conditions b and c, at least one further statistical test is needed to distinguish between these various possibilities when $E_a$ is low. Turning back to FIG. 5, this further test, referred to as a DT indicator, is also provided by double-talk detector 380.

The DT indicator is related to a quantity, sometimes referred to as the "loss estimate," that describes acoustic gains or losses in a given sub-band in the environment of, e.g., the speakerphone. Specifically, the square of the loss estimate is the ratio of the energy in the echo to the energy in the far input (in a given sub-band, and averaged over an appropriate time window). However, unlike the loss estimate, the DT indicator is here defined in terms of the auxiliary-channel near input $N_a + \sigma_F(F_a * H_a)$, which is a directly measurable quantity, rather than in terms of the echo $\sigma_F(F_a * H_a)$, which is directly measurable only when there is no near speech. A useful DT indicator can be specified, in detail, in several different ways.

The first step in constructing our currently preferred DT indicator G is to take the maximum value of the near input over a suitable time window, and the maximum value of the far input over the same time window, and to take the ratio of these quantities. (We have found that a norm defined in terms of maximum or minimum values responds better to the rapidly varying characteristics of human speech than, e.g., a mean value.) The result is an intermediate value $\hat{L}_a$, defined by $$\hat{L}_a = \frac{\max N_a + \sigma_F(F_a * H_a)}{\max \sigma_F F_a}. \quad (5)$$

It should be noted that in the absence of near speech, $\hat{L}_a$ is a measure of the gain in the room. (When the gain is less than unity, the room is often said to have "loss.") When there is near speech, $\hat{L}_a$ will typically be larger than the gain in the room. By taking, during the presence of far speech, a gated average of $\hat{L}_a$ that excludes those cases where near speech is present, it is possible to construct an estimate of the gain or loss between the loudspeaker and the microphone within the room, and thus to account for relative displacement between the two and for adjustments in the volume control of the loudspeaker. Such a gated average is denoted $L_a$, and defined by $$L_a = \frac{1}{N} \sum_i \epsilon_i \hat{L}_{ai}, \quad (6)$$

where $\epsilon_i$ is 1 if $E_a$ exceeds a predetermined threshold value $T_E$ and is 0 otherwise, $$N = \sum_i \epsilon_i,$$

and the summations are taken over an appropriate time window. (A typical value for N in speakerphone applications is about 4000.) Thus, $E_a$ is used as a near-speech detector for controlling the gate when this average is computed.

If near speech is present, $\hat{L}_a$ will generally be greater than $L_a$, because the numerator of the quantity defining $\hat{L}_a$ includes a contribution due to the near speech signal.

A further statistic needed for defining G is the quantity $\hat{L}'_a$, defined by:

$$\hat{L}'_a = \frac{\max \hat{N}_a}{\max \sigma_F F_a}. \quad (7)$$

We have found that if near speech is present, $\hat{L}_a$ will generally be greater than $L_a$. Accordingly, we have defined our currently preferred DT indicator G (in terms of a predetermined threshold $T_G$) by:

$$G = 1 \text{ if } \hat{L}'_a > T_G L_a; \quad (8)$$

G=0 otherwise.

A state machine model for a speakerphone has been previously described in U.S. Pat. No. 5,007,046, cited above. The states of the speakerphone described therein are RX, TX, and IDLE. Transitions between states are determined according to whether $$\frac{r_s}{r_n}$$

exceeds a predetermined threshold $\Theta_1$, whether $$\frac{t_s}{t_n}$$

exceeds a predetermined threshold $\Theta_2$, and whether $$\frac{t_s}{t_e}$$

exceeds a predetermined threshold, where $t_e$ is an expected reverberation level. The first two of these tests are referred to in Table I, herein, as $T_R$ and $T_T$, respectively. Each has the logical value 1 when the corresponding condition is satisfied, and the logical value 0 otherwise.

This three-state model is not entirely satisfactory, because it does not permit doubletalk. That is, it adds a large switch loss to the input from the side (i.e., far end or near end) that is not talking, according to the speech-detection algorithms. By forcing the signal processor into a choice of either the TX or RX state, with the accompanying switch loss, this model interferes with normal conversations in which a previously receiving party breaks in while the transmitting party is still speaking.

To solve this problem, we have added G as a third test, and $T_E$ as a fourth test. $T_E$ has the logical value 1 if $E_a$ is less than a predetermined threshold $\Theta_3$, and the logical value 0 otherwise.

Table I represents an illustrative state machine in which transitions are determined by the tests $T_R$, $T_T$, $T_E$, and G. The machine represented in the table is the currently preferred one of at least several alternative machines that are potentially applicable to the inventive signal processor.

The values of the parameters $\sigma_F$, $\sigma_N$, $\mu$, and CC are set according to the state of the signal processor. (The center-clipping indicator CC is set to 1 when center clipping is enabled, and to 0 when it is disabled.) A currently preferred relationship between the machine states and the values of these parameters is set out in Table II. Thus, in the RX state, for example, adaptation and center clipping are both enabled, and a certain amount of switch loss $\sigma_N^{RX}$ is applied to the signal transmitted to the far end.

The value of $\sigma_N^{RX}$ is determined by full-band performance detector 340 of FIG. 5. Briefly, a statistic $E_{\sigma N}$ similar to the ERLE is computed from the full-band far input F and the full-band far output $\hat{N}$:

$$E_{\sigma N}=\sqrt{\frac{L_\alpha(F^2)}{L_\alpha(\hat{N}^2)}}, \quad (9)$$

where $L_\alpha$ denotes digital, low-pass filtering, as previously discussed. Roughly speaking, $E_{\sigma N}$ assumes large values when the energy received from the far end is much greater than the energy transmitted to the far end, and assumes small values when the opposite is true. Because large values of $E_{\sigma N}$ imply that the signal processor is receiving, rather than transmitting, it is generally appropriate to apply relatively high values of $\sigma_N$ when $E_{\sigma N}$ is high.

Figure 8:
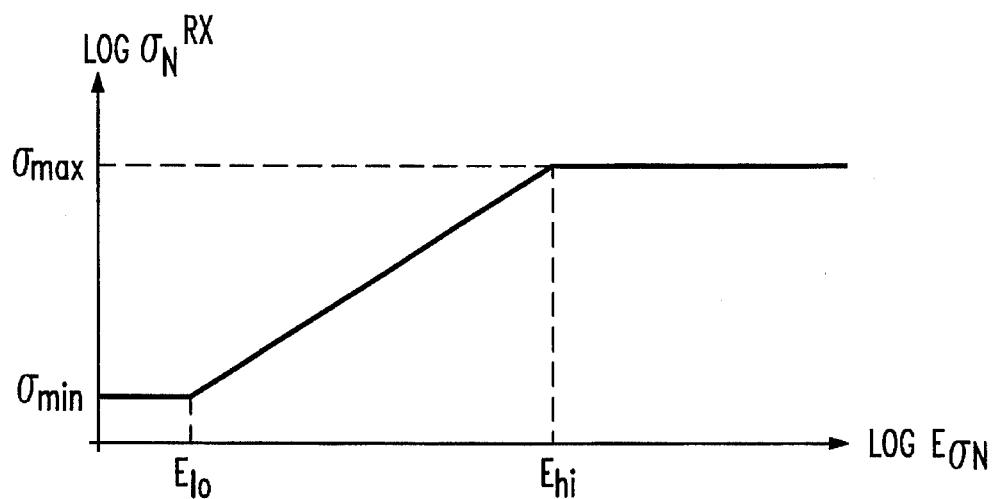
FIG. 8 is a graph showing exemplary continuously variable settings for a switch loss N according to the invention in one embodiment.

According to a currently preferred method for setting the value of $\sigma_N^{RX}$, a minimum value $\sigma_{min}$ and a maximum value $\sigma_{max}$ are selected. For values of $E_{\sigma N}$ below a threshold $E_{lo}$, $\sigma_N^{RX}=\sigma_{min}$, and for values of $E_{\sigma N}$ above a threshold $E_{hi}>E_{lo}$, $\sigma_N^{RX}=\sigma_{max}$. For intermediate values of $E_{\sigma N}$, $\sigma_N^{RX}$ is varied continuously between the minimum and maximum values. Illustratively, FIG. 8 shows a linear dependence between log $\sigma_N^{RX}$ and log $E_{\sigma N}$ for $E_{lo}<E_{\sigma N}<E_{hi}$.

As shown in Table I, adaptation is disabled in every state except the RX state. We also currently prefer to disable center clipping in all states but RX, although in at least some cases it may be desirable to enable center clipping in the DT state. In the IDLE state, transmission is permitted in both directions with no deliberate attenuation. Thus, both $\sigma_F$ and $\sigma_N$ are set to 1.0 in the IDLE state. In the DT state, we also permit bidirectional transmission, but with a moderate amount of loss applied equally in both directions. Thus, an illustrative setting for both $\sigma_F$ and $\sigma_N$ in the DT state is 0.7. (It should be noted in this regard that it is not desirable to vary $\sigma_F$ continuously, since this would impose a substantial burden on the adaptive filters.)

Turning back to FIG. 5, the near input signal on line 300 is sensed by a singing detector (not shown) before it is subjected to sub-band analyzer 210. When singing is detected, $\sigma_N$ is briefly set to 0 to interrupt the feedback loop. According to a currently preferred embodiment, the taps of the adaptive filter are also reset when singing is detected.

As discussed above, the statistics $E_a$ and G are derived using an auxiliary adaptive filter that runs continually. In, e.g., the first few moments after the cessation of doubletalk, this filter will experience an early learning phase in which adaptation is still poor but is progressing normally. During such an early learning phase, before the weight vector approaches full adaptation, the signal processor may erroneously declare the DT state. This can have the effect of keeping the signal processor in the DT state longer than necessary.

In order to reduce the frequency of these false DT declarations, it is possible, from time to time, to copy the elements of a well-adapted weight vector from that one of filters 230 that corresponds to the auxiliary sub-band. That is, filters 230 of the full-band filter bank do not adapt during doubletalk. As a consequence, each of these filters retains, at the cessation of doubletalk, a weight vector that, with high probability, is near full adaptation.

This copying is desirably carried out when two conditions are met: 1) the signal processor is currently in the DT state; and 2) a statistic related to the ERLE exceeds a predetermined threshold. The statistic we currently prefer to use to test for the second condition is the full-band statistic $E_{\sigma N}$ used to determine the switch loss applied to the signal transmitted to the far end, as described above. Alternatively, a sub-band statistic $E_c$ can be used. This statistic is evaluated similarly to $E_\sigma$ described above, using the sub-band c of the filter bank that corresponds to the auxiliary sub-band.

It should be noted, however, that if this copying procedure is repeated too frequently, it will interfere with the adaptation of the auxiliary filter during periods when such adaptation is necessary. Accordingly, it is desirable to include, e.g., a counter that permits copying only at certain intervals.

We believe that this copying procedure will decrease the frequency of false DT declarations, decrease the average duration of DT states, and improve the setting of switch losses.

We have added a fifth test $T_C$ to the state transition logic that applies when the signal processor is in the DT state. $T_C$ has the logical value 1 when the above-described threshold condition for copying is satisfied, and the logical value 0 otherwise.

A second potential problem involving detection of the DT state arises because the subthreshold values of $E_a$ that (in part) trigger the DT state are generally registered a short interval after doubletalk has actually begun. As a consequence, some inappropriate adaptation of filters 230 may take place. However, if the echo cancellation phase (i.e., the processing of the speech signal at filters 230 and processing steps subsequent thereto) is delayed relative to the state determination, it is possible to reduce or eliminate this interval, and thus to improve the adaptation of filters 230.

Such delay is, in fact, tolerable in at least certain applications. One such application is video teleconferencing, in which a substantial delay is added to the transmitted signal for the purpose of lip-synchronization. A portion of this total delay can be used for advance state detection, as described above.

Turning back to FIG. 4, delay 500 for advance state determination is shown therein as following the sub-band analyzer and preceding adaptive filters 230. However, the state determination (included in control 260) is not subject to that delay. Also indicated in the figure is a so-called "non-causal" delay 510. This delay on the near-input lines to the adaptive filters 230 is included to improve the performance of the adaptive filter algorithm. This feature is well-known in the art, and need not be described in detail here.

Figure 9:
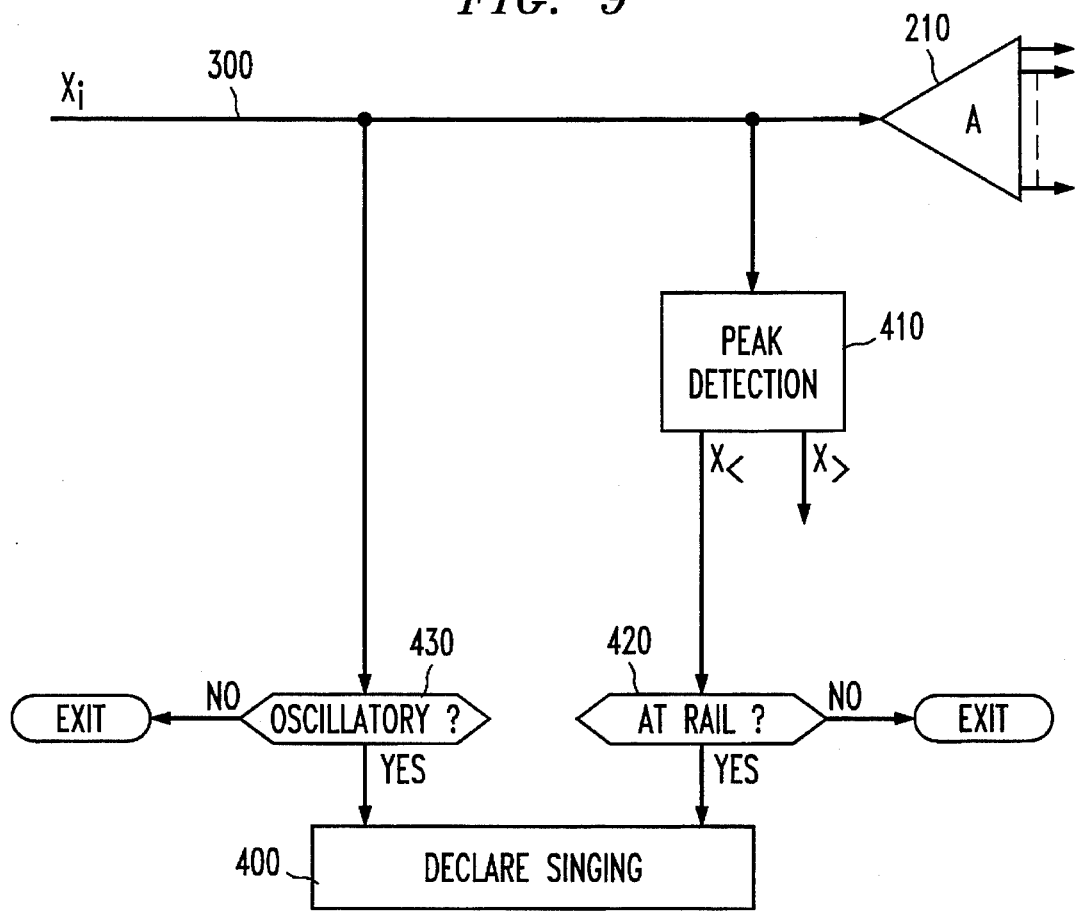
FIG. 9 is a schematic, block diagram of an exemplary procedure for singing detection, according to the invention in one embodiment.

FIG. 9 schematically depicts an illustrative algorithm for singing detection. The individual blocks of this figure represent well-known procedures that need not be described in detail. Briefly, this algorithm characterizes singing as a growing oscillation. Thus, singing will be declared (block 400 of the figure) if: 1) the signal is relatively large over a sufficient number of samples in succession; and 2) the signal oscillates. To determine whether the first condition is satisfied, the minimum output from peak detector 410 is compared, in comparator 420, to a predetermined threshold. If the threshold is exceeded for a predetermined number of successive cycles, the condition is satisfied. To determine whether the second condition is satisfied, comparator 430 counts the number of times the signal crosses a predetermined voltage level in succession within a given time interval, and the count is repeated in a second time interval equal in duration to the first. If the two counts are similar, the condition is satisfied.

Figure 10:
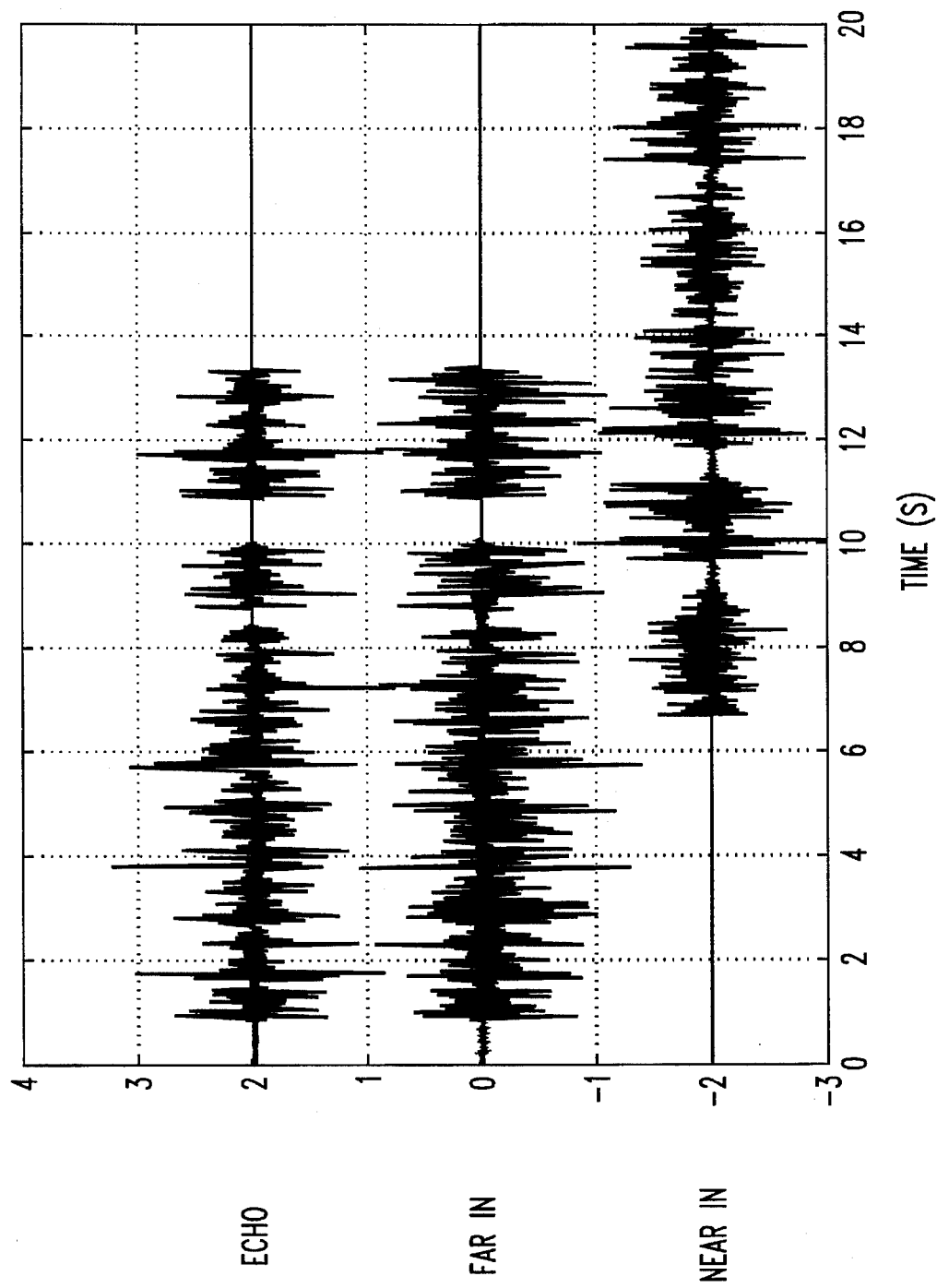
FIG. 10 is an oscillogram that represents exemplary speech waveforms to be processed by the inventive signal processor. The figure shows a far input waveform, a near input waveform, and an echo waveform.

FIG. 10 is an oscillogram that represents an exemplary speech waveform recorded over a time interval of 20 seconds. Depicted are the far input, the near input, and the echo received at the microphone. As is evident from the figure, there is only far input during, approximately, the initial six seconds. Both sides are active from about 6 seconds to about 13 seconds. Them is only local speech from about 13 seconds to 20 seconds.

Figure 11:
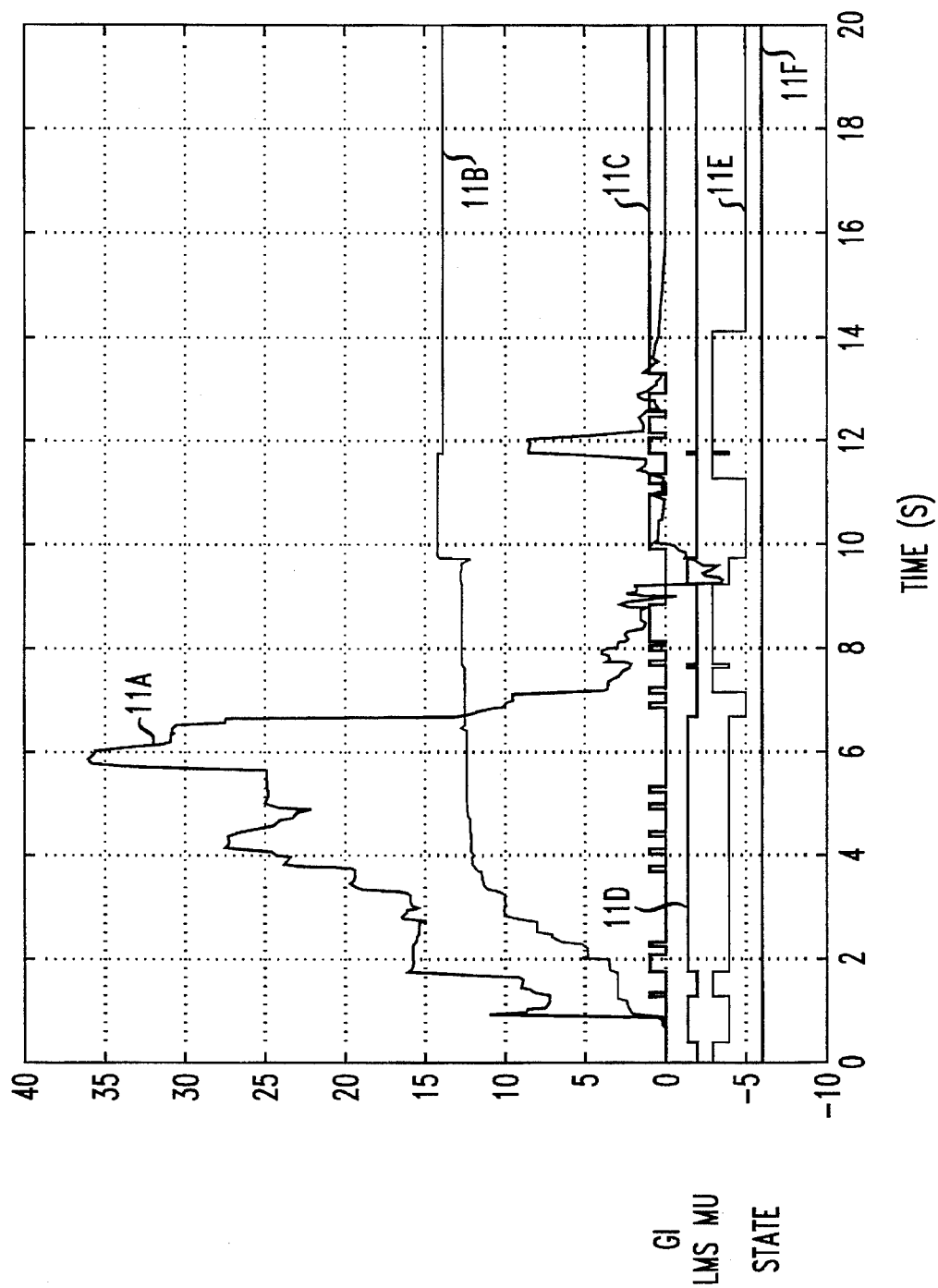
FIG. 11 is a graph depicting the states and various operating parameters of an exemplary signal processor, in response to the waveforms of FIG. 10.

FIG. 11 is a graph depicting the states and various operating parameters of an exemplary signal processor made according to the invention. The evolution of these values represents the response of the signal processor to the speech signals of FIG. 10. Curve 11A represents the statistic $E_a$, curve 11B represents the state of the taps of the adaptive filter, curve 11C represents the DT indicator G, and curve 11D represents the adaptation step size μ. Curve 11E represents the state of the signal processor, with increasing levels from baseline 11F representing the TX, RX, and DT states, respectively.

Initially, all of the taps of the adaptive filter are set to zero. The rising initial portion of curve 11A signifies a learning phase in which adaptation is occurring. The steep drop of the same curve at about 6.6 s marks the onset of doubletalk. Because there is no near speech after that point, the curve remains at low values thereafter.

Curve 11B represents the energy in the adaptive filter (i.e., the sum of the squares of the weights in at least one representative sub-band weight vector). The curve begins at zero because all the weights of the filter are initialized to zero. The curve rises as the learning phase progresses. When the filter is fully adapted, the curve levels off. A jump occurs at about 9.6 s, due to an erroneous enablement of adaptation during doubletalk.

Curve 11C ideally has a logical high value whenever there is near speech, i.e., from about 6.4 s to 20 s. The expected low-to-high transition is observed somewhat after 6 s. However, it is also observed to go high for several brief periods before the onset of near speech. It should be noted, however, that although G is somewhat noisy, it provides a reliable near speech indicator when combined with $E_a$.

Curve 11D is high whenever adaptation is taking place, and therefore it is high whenever curve 11E assumes the value corresponding to the RX state.

It should be noted that the signal processor can make erroneous state transitions based on short periods of silence, or on other conditions that are of very short duration. In order to suppress such erroneous transitions, it is desirable to include latches that prevent transitions from occurring too frequently. For example, one potentially useful latch will prevent transitions for a predetermined holdover time.

TABLE 1

| STATE DECISION LOGIC | | | | | | |
|---|---|---|---|---|---|---|
| Initial State | IDLE | | | | | |
| $T_R$ | 1 | 1 | 1 | 1 | 0 | 0 |
| $T_T$ | 1/0 | 1/0 | 1/0 | 1/0 | 1 | 0 |
| $T_E$ | 1 | 1 | 0 | 0 | 0/1 | 0/1 |
| G | 1 | 0 | 1 | 0 | 0/1 | 0/1 |
| Final State | DT | RX | RX | RX | TX | IDLE |
| Initial State | TX | | | | | |
| $T_R$ | 1 | | 1 | | 0 | 0 |
| G | 1 | | 0 | | 0/1 | 0/1 |
| $T_T$ | 0/1 | | 0/1 | | 1 | 0 |
| Final State | DT | | RX | | TX | IDLE |
| Initial State | RX | | | | | |
| $T_R$ | 1 | 1 | 1 | 1 | 0 | 0 |
| $T_E$ | 1 | 0 | 1 | 0 | 0/1 | 0/1 |
| G | 1 | 1 | 0 | 0 | 0/1 | 0/1 |
| $T_T$ | 0/1 | 0/1 | 0/1 | 0/1 | 1 | 0 |
| Final State | DT | RX | RX | RX | TX | IDLE |
| Initial State | DT | | | | | |
| $T_R$ | 1 | | 1 | 1 | 0 | 0 |
| $T_E$ | 1 | | 1 | 0 | 1/0 | 1/0 |
| $T_C$ | 1 | | 0 | 1/0 | 1/0 | 1/0 |
| $T_T$ | 1/0 | | 1/0 | 1/0 | 1 | 0 |
| Final State | RX | | DT | RX | TX | IDLE |

TABLE II

STATE-DETERMINED PARAMETER SETTINGS

| STATE | $\sigma_F$ | $\sigma_N$ | $\mu$ | CC |
|---|---|---|---|---|
| IDLE | 1 | 1 | 0 | 0 |
| TX | 1 | $\sigma_{max}$ | 0 | 0 |
| RX | 1 | $\sigma_N^{RX}$ | Adapt | 1 |
| DT | 0.7 | 0.7 | 0 | 0 |

What is claimed is:

1. A method for removing, from a communication signal, echoes generated from a reference signal by feedback through a medium, comprising:

a) declaring one of a plurality of operating states, depending on data characteristics of the communication signal and the reference signal;

b) responsive to the declared operating state, operating a main adaptive filter such that data are acquired describing the transfer characteristics of the medium in at least one signal frequency band;

c) responsive to said data, processing the reference signal to generate an estimated echo signal;

d) subtracting said estimated echo signal from the communication signal, thereby to form an echo-corrected signal;

e) delaying the communication signal and the reference signal such that each said signal is used as input for step (a) before it is used as input for step (b), such that the declaration of the operating state is made before the generation of the estimated echo signal, wherein:

f) step (a) comprises detecting a condition, to be referred to as "doubletalk," wherein the communication signal contains more activity than can be accounted for solely by the echoes;

g) step (a) further comprises, when doubletalk is detected, the step of declaring a corresponding operating state, to be referred to as the DT state;

h) during at least the DT state, the main adaptive filter is not permitted to acquire new data describing said transfer characteristics; and i) during at least some states which include the DT state, bidirectional communication is permitted.

2. A method for removing, from a communication signal, echoes generated from a reference signal by feedback through a medium, comprising:

a) declaring one of a plurality of operating states, depending on data characteristics of the communication signal and the reference signal;

b) responsive to the declared operating state, operating a main adaptive filter such that data are acquired describing the transfer characteristics of the medium in at least one signal frequency band;

c) responsive to said data, processing the reference signal to generate an estimated echo signal; and d) subtracting said estimated echo signal from the communication signal, thereby to form an echo-corrected signal; wherein:

e) step (a) comprises detecting a condition, to be referred to as "doubletalk," wherein the communication signal contains more activity than can be accounted for solely by the echoes;

f) step (a) further comprises, when doubletalk is detected, the step of declaring a corresponding operating state, to be referred to as the DT state;

g) during at least the DT state, the main adaptive filter is not permitted to acquire new data describing said transfer characteristics;

h) during at least some states which include the DT state, bidirectional communication is permitted;

i) the doubletalk-detecting step comprises: operating an auxiliary adaptive filter that is independent of said main adaptive filter and is permitted to acquire new transfer-characteristic data in all of said operating states; and evaluating the performance of the auxiliary adaptive filter; and j) the auxiliary adaptive filter acts upon a frequency subband smaller than, and contained within, the signal frequency band.

3. The method of claims 1, or 2, wherein the doubletalk-detecting step comprises the further steps of:

evaluating a statistic, to be denoted G, that indicates whether the communication signal contains more energy than the expected echo generated from the reference signal;

evaluating a statistic, to be denoted E, that indicates whether an echo signal is being effectively removed during the echo-signal-subtracting step; and declaring the DT state only if both G and E satisfy predetermined conditions.

4. The method of claim 3, wherein E and G are evaluated on respective signals derived from the communication signal and the reference signal, within a group of one or more frequency sub-bands that are each smaller than, and contained within, the signal frequency band.

5. The method of claim 4, wherein said group of one or more frequency subbands collectively spans a frequency range that is smaller than, and contained within, the signal frequency band.

6. The method of claim 4, wherein the steps of evaluating E and G comprise adaptively filtering the sub-band signal or signals derived from the communication signal.

7. The method of claim 6, wherein, if the reference signal is denoted F, the communication signal is denoted S, and the echo-corrected signal is denoted T, then the step of evaluating G comprises the further steps of:

a) evaluating the statistic $\hat{L}'_a$, defined as $$\frac{\max|T|}{\max|F|},$$

wherein the maxima are taken over appropriate time windows;

b) evaluating the statistic $\hat{L}_a$, defined $$\frac{\max|S|}{\max|F|},$$

wherein the maxima are taken over appropriate time windows;

c) evaluating the statistic $L_a$, defined as a gated average of $\hat{L}_a$ that counts only those values of $\hat{L}_a$ that occur when E exceeds a predetermined threshold;

d) setting G=1 if $\hat{L}'_a > T_G L_a$, wherein $T_G$ is a predetermined threshold; and e) setting G=0 otherwise.

8. The method of claim 7, wherein the reference signal comprises speech received by a communication device from a remote user, the communication signal comprises speech injected into the communication device by a local user, the communication device includes a microphone and a loudspeaker, and the step of operating a main adaptive filter is carried out in such a way that data are acquired describing at least the transfer characteristics of an acoustic path from the loudspeaker to the microphone through a room that contains the communication device.

9. The method of claim 3, wherein the reference signal comprises speech received by a communication device from a remote user, the communication signal comprises speech injected into the communication device by a local user, the communication device includes a microphone and a loudspeaker, and the step of operating a main adaptive filter is carried out in such a way that data are acquired describing at least the transfer characteristics of an acoustic path from the loudspeaker to the microphone through a room that contains the communication device.

10. The method of claim 1, or 2, wherein the reference signal comprises speech received by a communication device from a remote user, the communication signal comprises speech injected into the communication device by a local user, the communication device includes a microphone and a loudspeaker, and the step of operating a main adaptive filter is carried out in such a way that data are acquired describing at least the transfer characteristics of an acoustic path from the loudspeaker to the microphone through a room that contains the communication device.

11. In the operation of a communication system having a microphone and a loudspeaker so disposed that there is a feedback path from the loudspeaker to the microphone, a method for measuring coupling loss that inheres between the loudspeaker and the microphone, said loss optionally including gain due to amplification of input to the loudspeaker and output from the microphone, the method comprising:
   a) operating an adaptive filter, thereby to acquire data that represent coupling characteristics of the feedback path;
   b) detecting when the adaptive filter is well adapted and when it is not well adapted; and
   c) updating an estimate of the coupling loss only when the adaptive filter is well adapted, said updating step comprising the further step of enabling a gated average to be updated only when an indicator of adaption of said adaptive filter exceeds a threshold.

12. A method for operating an echo canceller for removing, from a communication signal, echoes generated from a reference signal by feedback through a medium, comprising:
   a) declaring one of a plurality of operating states of the echo canceller, according to data characteristics of the communication signal and the reference signal;
   b) responsive to the declared operating state, permitting a main adaptive filter to acquire data that describe the transfer characteristics of the medium in at least one signal frequency band;
   c) responsive to said data, processing the reference signal to generate an estimated echo signal; and
   d) subtracting said estimated echo signal from the communication signal, thereby to form an echo-corrected signal; wherein:
   e) the declaring step comprises testing for a condition, to be referred to as "doubletalk," in which the communication signal contains more activity than can be accounted for solely by the echoes, and further comprises declaring a particular operating state, to be referred to as the DT state, whenever doubletalk is detected;
   f) permission for the main adaptive filter to acquire new transfer-characteristic data is withheld during at least the DT state;
   h) the step of testing for doubletalk comprises measuring coupling loss that is associated with the feedback through the medium, measuring energy of the communication signal, and detecting when said energy exceeds levels predicted for pure echoes on the basis of said coupling loss; and
   i) the step of measuring coupling loss comprises operating an auxiliary adaptive filter that acquires data describing transfer characteristics of the medium, detecting when the auxiliary adaptive filter is well adapted, and updating an estimate of the coupling loss only when the auxiliary adaptive filter is well adapted.

13. Apparatus for removing, from a communication signal, echoes generated from a reference signal by feedback through a medium, comprising:
   a) means for declaring one of a plurality of operating states, depending on data characteristics of the communication signal and the reference signal;
   b) responsive to the declared operating state, a main adaptive filter for acquiring data that describe the transfer characteristics of the medium in at least one signal frequency band;
   c) responsive to said data, means for processing the reference signal to generate an estimated echo signal; and
   d) means for subtracting said estimated echo signal from the communication signal, thereby to form an echo-corrected signal; wherein:
   e) the declaring means comprise means for detecting a condition, to be referred to as "doubletalk, in which the communication signal contains more activity than can be accounted" for solely by the echoes;
   f) the declaring means further comprise means, responsive to the doubletalk-detection means, for declaring a particular operating state, to be referred to as the DT state, whenever doubletalk is detected;
   g) the apparatus further comprises means for preventing the main adaptive filter, during at least the DT state, from acquiring new data describing said transfer characteristics;
   h) the apparatus is adapted to permit bidirectional communication during at least some states which include the DT state; and
   i) the doubletalk-detection means comprise: an auxiliary adaptive filter that is independent of said main adaptive filter and is permitted to acquire new transfer-characteristic data in all of said operating states, and means for evaluating the performance of the auxiliary adaptive filter, said auxiliary adaptive filter acting upon a frequency subband smaller than, and contained within, the signal frequency band.

14. Apparatus of claim 13, wherein:
the doubletalk-detecting means comprise means for evaluating a statistic, to be denoted G, that indicates whether the communication signal contains more energy than the expected echo generated from the reference signal; and means for evaluating a statistic, to be denoted E, that indicates whether an echo signal is being effectively removed during the echo-signal-subtracting step;
the E-evaluating means and the G-evaluating means each operate on respective signals derived from the communication signal and the reference signal, within a group of one or more frequency sub-bands that are each smaller than, and contained within, the signal frequency band;

the declaring means are adapted to declare the DT state only if both G and E satisfy predetermined conditions;

the E-evaluating means and the G-evaluating means comprise the auxiliary adaptive filter; and the auxiliary adaptive filter operates on the sub-band signal or signals derived from the communication signal.

15. Apparatus of claim 14, wherein, if the reference signal is denoted F, the communication signal is denoted S, and the echo-corrected signal is denoted T, then the G-evaluating means further comprise:

a) means for evaluating the statistic $\hat{L}'_a$, defined as $$\frac{\max|T|}{\max|F|},$$

wherein the maxima are taken over appropriate time windows;

b) means for evaluating the statistic $\hat{L}_a$, defined as $$\frac{\max|S|}{\max|F|},$$

wherein the maxima are taken over appropriate time windows;

c) a gated averager for evaluating the statistic $L_a$, defined as a gated average of $\hat{L}_a$ that counts only those values of $\hat{L}_a$ that occur when E exceeds a predetermined threshold; and d) means for setting G=1 if $\hat{L}'_a > T_G L_a$, wherein $T_G$ is a predetermined threshold, and for setting G=0 otherwise.

16. Apparatus for removing, from a communication signal, echoes generated from a reference signal by feedback through a medium, comprising:

a) means for declaring one of a plurality of operating states, depending on data characteristics of the communication signal and the reference signal;

b) responsive to the declared operating state, an adaptive filter for acquiring data that describe the transfer characteristics of the medium in at least one signal frequency band;

c) responsive to said data, means for processing the reference signal to generate an estimated echo signal;

d) means for subtracting said estimated echo signal from the communication signal, thereby to form an echo-corrected signal; and e) means for delaying the communication signal and the reference signal such that each said signal is used as input for said means for declaring before it is used as input for said adaptive filter and such that the declaration of the operating state is made before the generation of the estimated echo signal, wherein:

f) the declaring means comprise means for detecting a condition, to be referred to as "doubletalk," in which the communication signal contains more activity than can be accounted for solely by the echoes;

g) the declaring means further comprise means, responsive to the doubletalk-detection means, for declaring a particular operating state, to be referred to as the DT state, whenever doubletalk is detected;

h) the apparatus further comprises means for preventing the adaptive filter, during at least the DT state, from acquiring acquire new data describing said transfer characteristics; and i) the apparatus is adapted to permit bidirectional communication during at least some states which include the DT state.

17. Apparatus of claim 13, or 16, wherein:

the doubletalk-detecting means comprise means for evaluating a statistic, to be denoted G, that indicates whether the communication signal contains more energy than the expected echo generated from the reference signal; and means for evaluating a statistic, to be denoted E, that indicates whether an echo signal is being effectively removed during the echo-signal-subtracting step; and the declaring means are adapted to declare the DT state only if both G and E satisfy predetermined conditions.

18. Apparatus of claim 17 wherein the E-evaluating means and the G-evaluating means each operate on respective signals derived from the communication signal and the reference signal, within a group of one or more frequency sub-bands that are each smaller than, and contained within, the signal frequency band.

19. Apparatus of claim 18, wherein said group of one or more frequency subbands collectively spans a frequency range that is smaller than, and contained within, the signal frequency band.

20. A communication device adapted for receiving electrical signals to be referred to as reference signals, said device comprising: a loudspeaker for transducing the reference signals into acoustic signals; a microphone for transducing locally generated speech into electrical signals to be referred to as communication signals; and an echo canceller for removing from the communication signals echoes generated by acoustic feedback of the reference signals, thereby to produce an echo-corrected signal, wherein the echo canceller comprises:

a) means for declaring one of a plurality of operating states, depending on data characteristics of the communication signals and the reference signals;

b) responsive to the declared operating state, a main adaptive filter for acquiring data that describe the transfer characteristics of at least the acoustic path from the loudspeaker to the microphone in at least one signal frequency band;

c) responsive to said data, means for processing the reference signals to generate estimated echo signals; and d) means for subtracting said estimated echo signals from the communication signals, thereby to form echo-corrected signals; wherein:

e) the declaring means comprise means for detecting a condition, to be referred to as "doubletalk," in which a communication signal contains more activity than can be accounted for solely by the echoes;

f) the declaring means further comprise means, responsive to the doubletalk-detection means, for declaring a particular operating state, to be referred to as the DT state, whenever doubletalk is detected;

g) the echo canceller further comprises means for preventing the main adaptive filter, during at least the DT state, from acquiring new data describing said transfer characteristics;

h) the echo canceller is adapted to permit bidirectional communication during at least some states which include the DT state; and i) the doubletalk-detection means comprise: an auxiliary adaptive filter that is independent of said main adaptive filter and is permitted to acquire new transfer-characteristic data in all of said operating states, and means for evaluating the performance of the auxiliary adaptive filter.

21. Apparatus of claim 20, further comprising delay means for delaying the communication signals and the reference signals, such that each said signal is used as input for said means for declaring before it is used as input for said main adaptive filter and such that the declaration of the operating state is made before the generation of the estimated echo signals.

22. Apparatus of claim 20, wherein:

the declaring means further comprise means for detecting a condition wherein a communication signal substantially contains only an echo of the reference signal, and means, responsive to detection of such a condition, for declaring a further operating state, to be referred to as the RX state;

the communication device further comprises means for determining a value for a transfer coefficient $\sigma_N$, and means for applying $\sigma_N$ to the echo-corrected signal during the RX state; and the transfer-coefficient-determining means comprise: means for evaluating a statistic that indicates whether an echo is being effectively removed during operation of the echo canceller; and means, responsive to at least certain values of said statistic, for varying $\sigma_N$ continuously according to the value of said statistic.

23. In a communication system having a microphone and a loudspeaker so disposed that there is a feedback path from the loudspeaker to the microphone, apparatus for measuring coupling loss that inheres between the loudspeaker and the microphone, said loss optionally including gain due to amplification of input to the loudspeaker and output from the microphone, the apparatus comprising:

a) an adaptive filter that in operation acquires data that represent coupling characteristics of the feedback path;

b) means for indicating when the adaptive filter is well adapted; and c) means, responsive to the indicating means, for updating an estimate of the coupling loss only when the adaptive filter is well adapted, said means comprising means for enabling a gated average to be updated when an indicator of adaptation of said adaptive filter exceeds a threshold, and for denying said average to be updated at other times.

24. Apparatus for removing, from a communication signal, echoes generated from a reference signal by feedback through a medium, comprising:

a) means for declaring one of a plurality of operating states, depending on data characteristics of the communication signal and the reference signal;

b) responsive to the declared operating state, a main adaptive filter for acquiring data that describe the transfer characteristics of the medium in at least one signal frequency band;

c) responsive to said data, means for processing the reference signal to generate an estimated echo signal; and d) means for subtracting said estimated echo signal from the communication signal, thereby to form an echo-corrected signal; wherein:

e) the declaring means comprise means for detecting a condition, to be referred to as "doubletalk," in which the communication signal contains more activity than can be accounted for solely by the echoes;

f) the declaring means further comprise means, responsive to the doubletalk-detection means, for declaring a particular operating state, to be referred to as the DT state, whenever doubletalk is detected;

g) the apparatus further comprises means for preventing the main adaptive filter, during at least the DT state, from acquiring new data describing said transfer characteristics;

h) the doubletalk-detection means comprise means for measuring coupling loss that is associated with the feedback through the medium, means for measuring energy of the communication signal, and means for detecting when said energy exceeds levels predicted for pure echoes on the basis of said coupling loss; and i) the coupling-loss-measuring means comprise an auxiliary adaptive filter that in operation acquires data that describe transfer characteristics of the medium, means for indicating when the adaptive filter is well adapted; and means, responsive to the indicating means, for updating an estimate of the coupling loss only when the adaptive filter is well adapted.

* * * * *